US009563374B2

United States Patent
Lo et al.

(10) Patent No.: US 9,563,374 B2
(45) Date of Patent: Feb. 7, 2017

(54) STORAGE PROXY METHOD FOR DATA-SERVICE SAN APPLIANCE

(71) Applicants: Horatio Lo, Milpitas, CA (US); Warren Lo, Taipei (TW); David Lee, San Jose, CA (US)

(72) Inventors: Horatio Lo, Milpitas, CA (US); Warren Lo, Taipei (TW); David Lee, San Jose, CA (US)

(*) Notice: Subject to any disclaimer, the term of this patent is extended or adjusted under 35 U.S.C. 154(b) by 116 days.

(21) Appl. No.: 14/568,811

(22) Filed: Dec. 12, 2014

(65) Prior Publication Data

US 2015/0169242 A1    Jun. 18, 2015

Related U.S. Application Data

(60) Provisional application No. 61/916,554, filed on Dec. 16, 2013.

(51) Int. Cl.

| G06F 12/00 | (2006.01) |
| G06F 13/00 | (2006.01) |
| G06F 13/28 | (2006.01) |
| G06F 3/06 | (2006.01) |
| G06F 11/00 | (2006.01) |
| H04L 29/08 | (2006.01) |

(52) U.S. Cl.
CPC ........... *G06F 3/0619* (2013.01); *G06F 3/0604* (2013.01); *G06F 3/065* (2013.01); *G06F 3/067* (2013.01); *G06F 3/0658* (2013.01); *G06F 3/0665* (2013.01); *G06F 11/00* (2013.01); *H04L 67/1097* (2013.01)

(58) Field of Classification Search
CPC ...... G06F 3/0619; G06F 3/0604; G06F 3/065; G06F 3/0658; G06F 3/067; G06F 3/0683; G06F 3/0688; G06F 3/0689; G06F 11/00; G06F 11/0727; G06F 3/0605; G06F 3/0665; H04L 67/1097; H04L 49/356; H04L 29/08549
USPC ................................ 711/114, 162, 161, 203
See application file for complete search history.

(56) References Cited

U.S. PATENT DOCUMENTS

| 6,772,270 | B1 | 8/2004 | Kurpanek | |
| 2002/0103943 | A1 | 8/2002 | Lo et al. | |
| 2002/0133746 | A1 | 9/2002 | Chen et al. | |
| 2003/0236945 | A1 | 12/2003 | Nahum | |
| 2004/0225775 | A1* | 11/2004 | Pellegrino | G06F 13/102 710/200 |
| 2007/0239944 | A1* | 10/2007 | Rupanagunta | G06F 3/0613 711/147 |

(Continued)

*Primary Examiner* — Yaima Rigol
*Assistant Examiner* — Shane Woolwine
(74) *Attorney, Agent, or Firm* — Haynes and Boone, LLP (57) ABSTRACT

The storage proxy method is used in a storage area network (SAN) which includes a server, a SAN device coupled to the server, and a first and a second storage systems coupled to the SAN device and their logic units mirrored with each other to form a combined mirrored logical unit. The storage proxy method includes the following steps. One of the logical units of the storage systems as a proxy logical unit is selected. The mirrored logical unit is simulated as a virtual logical unit in the SAN device, wherein the virtual logical unit has a virtual identity the same as the identity of the selected proxy logical unit. A transparent communication for management functions between the server and the proxy logical unit is provided via the virtual logical unit or a special proxy logical unit.

20 Claims, 8 Drawing Sheets

(56) References Cited

U.S. PATENT DOCUMENTS

2007/0294563 A1 12/2007 Bose
2009/0083511 A1* 3/2009 Kanda .................. G06F 3/0604
 711/173
2012/0030670 A1 2/2012 Vijay et al.

* cited by examiner

STORAGE PROXY METHOD FOR DATA-SERVICE SAN APPLIANCE

CROSS-REFERENCE TO RELATED APPLICATION AND CLAIM OF PRIORITY

The application claims the benefit of U.S. Provisional Patent Application No. 61/916,554, filed on Dec. 16, 2013, in the United States Patent and Trademark Office, the disclosure of which is incorporated herein in its entirety by reference.

FIELD OF THE INVENTION

The present invention is generally to facilitate transparent data services of a SAN appliance for data storage.

More specifically, the present invention relates to a computer-implemented method, data-processing system, and computer-usable program code to present the identity and unique in-band communication methods of the represented storage, in order to add transparent data-service functions without interfering with the host-storage native functions and managements to the underlying storage, for uninterrupted online maintenance.

BACKGROUND OF THE INVENTION

A data-services storage area network (SAN) appliance, inserted into a data path between servers and storage systems, can provide data services, such as data replication, data caching, etc., by passing some commands through transparently, while altering others and initiating additional commands itself, depending on the needs of the service being provided.

Today, most other SAN applications choose to "virtualize" the storage underneath them (storage virtualization) and present a new "virtual volume" with its own identity to servers, and provide its own drivers and management programs to operate it.

Figure 1:
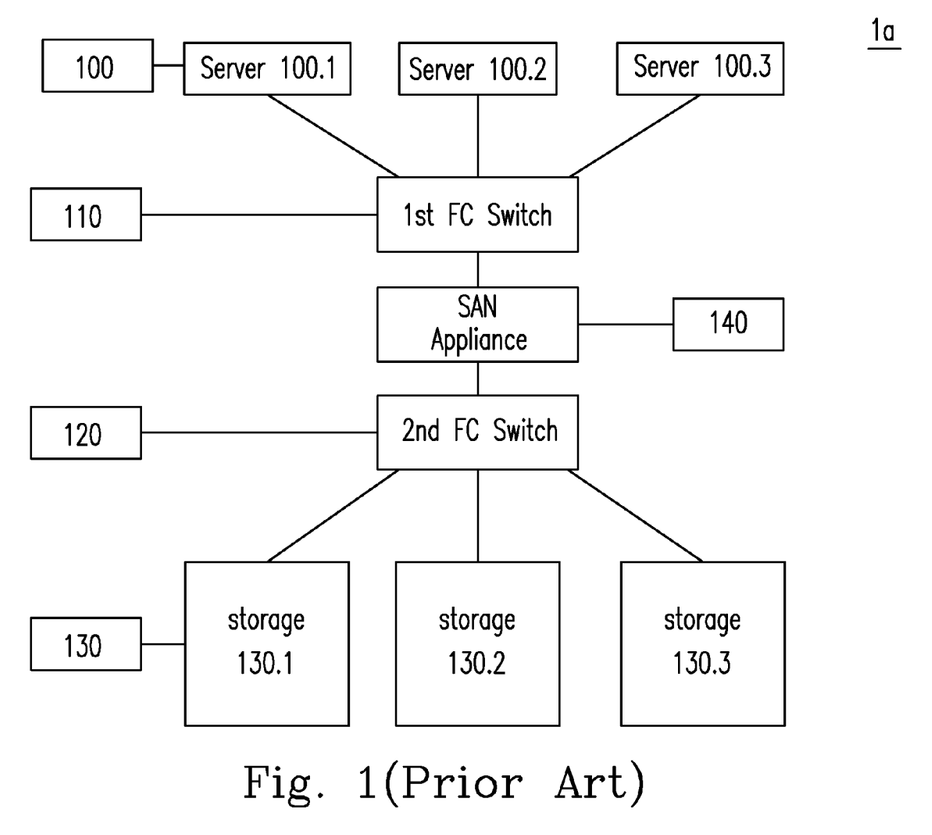
FIG. 1 shows a conventional SAN configuration.

Please refer to FIG. 1, which shows a conventional SAN configuration 1a that is configured between a first fibre channel (FC) switch 110 and a second FC switch 120. The conventional SAN configuration 1a includes a server set 100, the first FC switch 110, a SAN appliance 140, the second FC switch 120 and a storage system set 130, wherein the server set 100 contains a plurality of servers 100.1-100.3 and the storage system set 130 contains a plurality of storage systems 130.1-130.3. The plurality of servers 100.1-100.3 are electrically connected to the first FC switch 110 individually and the first FC switch 110 is electrically connected to the SAN appliance 140. Similarly, the SAN appliance 140 is electrically connected to the second FC switch 120 and the plurality of storage systems 130.1-130.3 are electrically connected to the second FC switch 120 individually.

Document US2007/0294563A1 discloses a data storage system and method. The system may comprise a data repository, and first and second storage controllers. One or more clients may access the data in the data repository via the first and second storage controllers. The second storage controller may be configured to at least partially inhibit network connectivity of the first storage controller if the first storage controller at least partially fails.

Document US2002/0133746A1 discloses a system and method of achieving High Availability on fibre channel data paths between an appliance's fibre channel switch and its storage device by employing a technique called "port spoofing." The main purpose of this patent is dealing with component failure and does not provide transparent data-service for uninterrupted online maintenance.

Document US2012/0030670A1 discloses various systems and methods for providing high availability of an application executing in a highly-available virtual machine environment. This patent designs a method to determine whether the virtual machine should be restarted. The main purpose of this patent is dealing with component failure and does not provide transparent data-service for uninterrupted online maintenance.

Document U.S. Pat. No. 6,772,270B1 discloses a computer-subsystem configuration that allows Fibre Channel devices to couple with more than one such device or host computer. The main purpose of this patent is to allow configuration options without the use of an external hub device and does not provide transparent data-service for uninterrupted online maintenance.

Document US2002/0103943A1 discloses a distributed storage management platform (DSMP) architecture. This patent further introduces an idea of "storage virtualization" and does not provide transparent data-service for uninterrupted online maintenance.

Document US2003/0236945A1 discloses a method for storage virtualization in a Storage Area Network (SAN). The method is characterized by comprising the step of coupling a Storage Virtualization Manager (SVM). Also, the patent does not provide transparent data-service for uninterrupted online maintenance.

The conventional SAN configuration 1a is described above. Today, most other SAN appliances choose to "virtualize" the storage underneath them (storage virtualization) and present a new "virtual volume" with its own identity to servers, and provide its own drivers and management programs to operate it. However, in this respect, owing to the presence of the new "virtual volume", the servers may not recognize the storage without re-configuration and re-mediation.

In order to overcome the drawbacks in the prior art, a storage proxy method for data-service SAN appliance is provided. The particular design in the present invention not only solves the problems described above, but also is easy to be implemented. Thus, the present invention has the utility for the industry.

SUMMARY OF THE INVENTION

In accordance with an aspect of the present invention, a storage proxy method is provided. In a storage area network (SAN) configuration, a SAN device is configured between a server and a first and a second storage systems, wherein the first storage system includes a first logical unit and the second storage system includes a second logical unit mirrored with the first logical unit, where the first and second logical units combine to form a first mirrored logical unit. Each of the logical units has a specific identity. The SAN device is connected to the server on one side and is connected to the first and the second storage systems on the other side. The storage proxy method can be applied to the above-mentioned SAN configuration. The storage proxy method comprises steps of: selecting one of the logical units of one of the first and second storage systems as a first proxy logical unit; simulating the first mirrored logical unit as a first virtual logical unit in the SAN device, wherein the first virtual logical unit has a first virtual identity the same as the identity of the first proxy logical unit, and providing a transparent communication of management functions between the server and the first proxy logical unit via the first virtual logical unit.

Another objective of the present invention is to provide a transparent communication of management functions. The aforesaid objective may be achieved by a storage area network (SAN) device for providing a transparent communication of management functions. The SAN device includes a first interface, a second interface and a processor, wherein the first interface is connected to a server and the second interface is connected to a first storage system and a second storage system. The first storage system includes a first logical unit; the second storage system includes a second logical unit mirrored with the first logical unit, where the first and second logical units combine to form a first mirrored logical unit, and each of the logical units has a specific identity. Furthermore, the processor is configured to select one of the logical units of one of the first and second storage systems as the first proxy logical unit; then to simulate the mirrored logical unit as a first virtual logical unit in the SAN device, wherein the first virtual logical unit has a first virtual identity the same as the identity of the first proxy logical unit; and then to provide a transparent communication of management functions between the server and the first proxy logical unit via the first virtual logical unit.

It is yet another objective of the present invention to provide a method for providing data mirroring service transparently between a server and a storage system named proxy storage system to facilitate storage maintenance service without the server interruption. The proxy storage system has at least one logical unit named proxy logical unit. The method comprises steps of: firstly, providing a storage area network and a SAN device; secondly, providing a redundant storage system connected to the SAN device; and thirdly, initiating the mirroring between logical unit in proxy storage system and logical unit in redundant storage system as a virtual logical unit in the SAN device, wherein the virtual logical unit has a virtual identity being the same as an identity of the proxy logical unit. Moreover, the SAN device is connected to the server and the proxy storage system. This third step of the method further comprises having a redundant logical unit mirrored with the proxy logical unit, where the proxy logical unit and the redundant logical unit combine to form a mirrored logical unit.

The above objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The present invention is generally to facilitate transparent data services of the SAN appliance 140 for data storage. More specifically, the present invention relates to a computer-implemented method, data-processing system, and computer-usable program code to present the identity and unique in-band communication methods of the represented storage, in order to add transparent data-service functions without interfering with the native functions and management of the underlying storage.

Instead of virtualizing the storage, the invented storage proxy method enables the SAN appliance 140 to present the storages' own identities and characteristics to servers while providing additional data services to complement the underlying storage. The invented storage proxy method enables the original storage drivers and management programs to work without interference from the SAN appliance 140.

Figure 2:
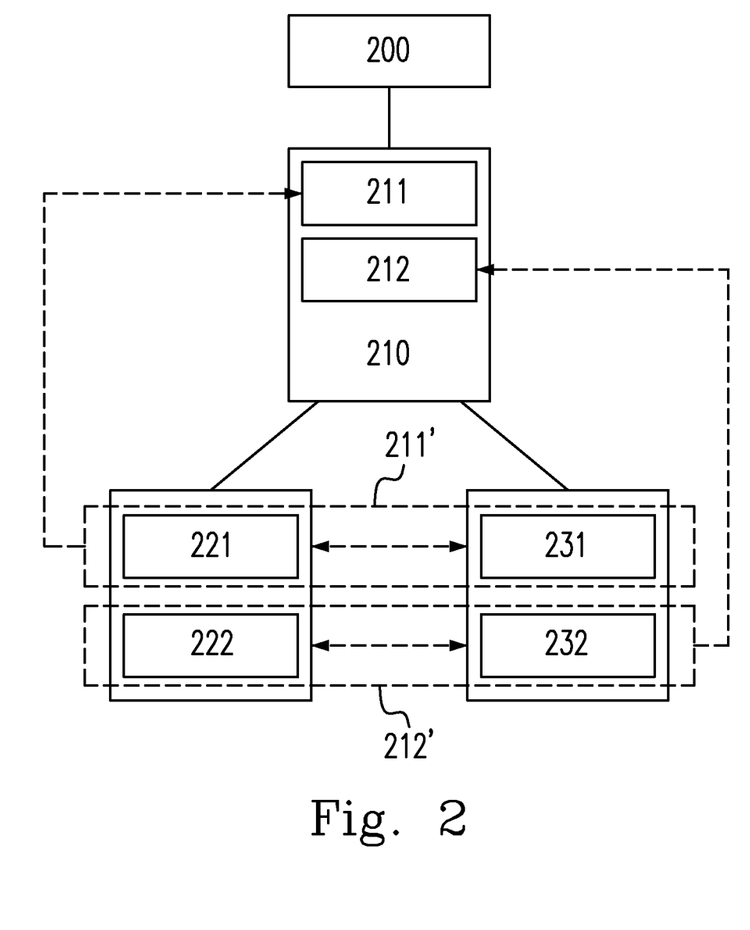
FIG. 2 shows a logical view of a two-way data-mirroring enabled by a SAN device.

Please refer to FIG. 2, which shows a logical view of a two-way data-mirroring enabled by a SAN device 210. Data-mirroring is one of transparent communications provided by the SAN device 210, and in a two-way data-mirroring, there are two storage systems being used. FIG. 2 discloses the SAN device 210 that is logically configured between a server 200, and a first storage system 220 and a second storage system 230. The first storage system 220 includes a first logical unit 221 and a third logical unit 222. The second storage system 230 includes a second logical unit 231 and a fourth logical unit 232.

In FIG. 2, the first logical unit 221 is mirrored with the second logical unit 231 by the SAN device 210, where the first logical unit 221 and the second logical unit 231 combine to form a first mirrored logical unit 211', which is presented or simulated as a first virtual logical unit 211 to the server 200. The third logical unit 222 is mirrored with the fourth logical unit 232 by the SAN device 210, where the third logical unit 222 and the fourth logical unit 232 combine to form a second mirrored logical unit 212', which is presented or simulated as a second virtual logical unit 212.

Figure 3A:
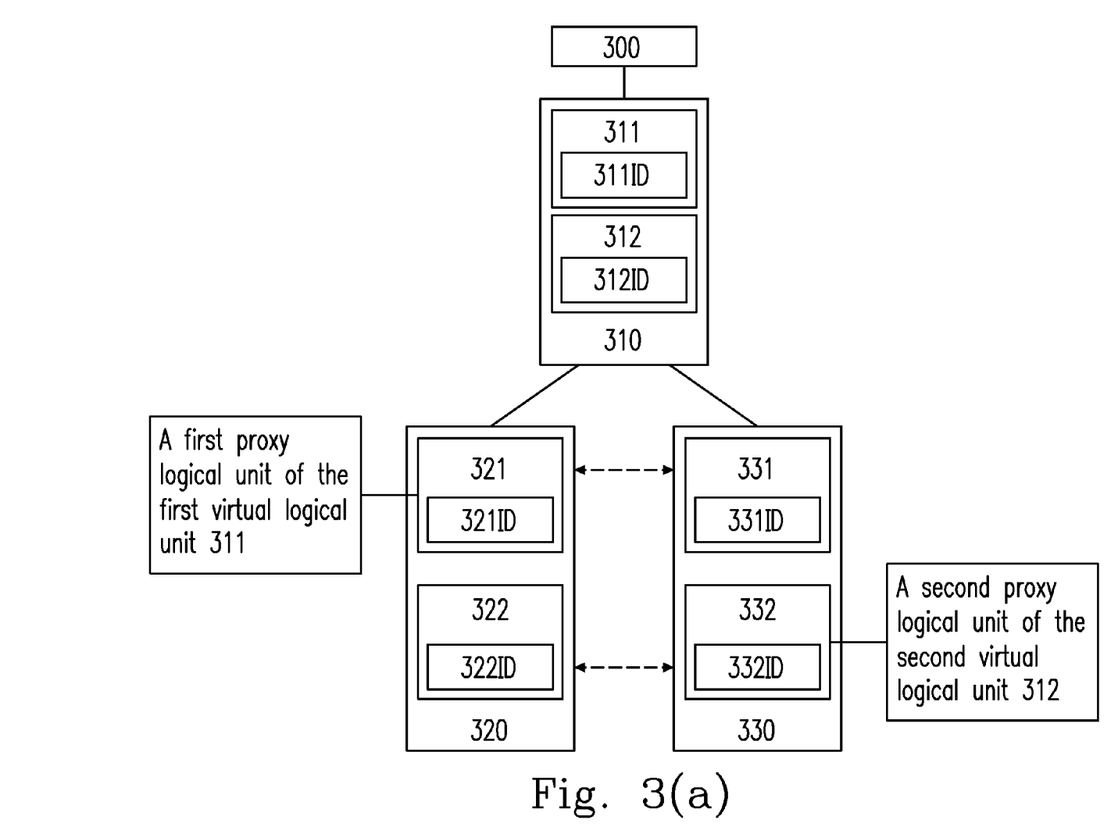
FIG. 3(a) shows a SAN device to present unique in-band communication methods of a first storage system and a second storage system.

Please refer to FIG. 3(a), which shows a SAN device 310 to present unique in-band communication methods of a first storage system 320 and a second storage system 330. The SAN device 310 presents a first virtual logical unit 311 and a second virtual logical unit 312, wherein the first virtual logical unit 311 includes a first virtual identity 311ID and the second virtual logical unit 312 includes a second virtual identity 312ID. In FIG. 3(a), a server 300 is coupled or electrically connected to the SAN device 310, and the SAN device 310 is coupled or electrically connected to the first storage system 320 and the second storage system 330, wherein the first storage system 320 includes a first logical unit 321 and a third logical unit 322, and the second storage system 330 includes a second logical unit 331 and a fourth logical unit 332. Furthermore, the first logical unit 321 includes a first logical unit identity 321ID, and the third logical unit 322 includes a third logical unit identity 322ID. The second logical unit 331 includes a second logical unit identity 331ID and the fourth logical unit 332 includes a fourth logical unit identity 332ID.

As shown in FIG. 3(a), a two-way data-mirroring is enabled by the SAN device 310. While operating in the data-mirroring, the first logical unit 321 is mirrored with the second logical unit 331, and the first and the second logical units 321 and 331 constitute a first mirrored logical unit (not shown), which is presented or simulated as the first virtual logical unit 311 in the SAN device 310. Similarly, the third logical unit 322 is mirrored with the fourth logical unit 332, and the third and the fourth logical units 322 and 332 constitute a second mirrored logical unit (not shown), which is presented or simulated as the second virtual logical unit 312 in the SAN device 310.

The invented storage proxy method allows the SAN device 310, at user's discretion, to utilize the identity from the two logical units providing storage for the mirror. That is to say, the server 300 can utilize either the first logical unit identity 321ID or the second logical unit identity 331ID as the first virtual identity 311ID. Also, the server 300 can utilize either the third logical unit identity 322ID or the fourth logical unit identity 332ID as the second virtual identity 312ID. As shown in FIG. 3(a), the first logical unit 321 has been chosen to provide its identity, which is the first logical unit identity 321ID, for the first virtual logical unit 311 and is called a first proxy logical unit of the first virtual logical unit 311. Similarly, the fourth logical unit 332 has been chosen to provide its identity, which is the fourth logical unit identity 332ID, for the second virtual logical unit 312 and is called a second proxy logical unit of the second virtual logical unit 312.

The first virtual logical unit 311 and the second virtual logical unit 312 are neither the first storage system 320 nor the second storage system 330. They are a combination of the first storage system 320 and the second storage system 330. With the traditional method provided by the conventional SAN configuration 1a, the SAN appliance 140 creates new identities for the first virtual logical unit 311 and the second virtual logical unit 312, which are not the same as the identities of the first logical unit identity 321ID, the second logical unit identity 331ID, the third logical unit identity 322ID and the fourth logical unit identity 332ID.

The first virtual identity 311ID may be saved in a non-volatile memory of the SAN device 310, after it's retrieved from the first proxy logical unit of the first virtual logical unit 311. If the storage system containing the first proxy logical unit of the first virtual logical unit 311 is offline, the SAN device 310 will still be able to report the first logical unit identity 321ID.

The SAN device 310 transparently passes through to the first proxy logical unit of the first virtual logical unit 311 any vendor-unique command it received for the first virtual logical unit 311. In addition, the SAN device 310 also transparently passes through to the second proxy logical unit of the second virtual logical unit 312 any vendor-unique command it received for the second virtual logical unit 312. Thus the server 300 is able to manage the first storage system 320 and the second storage system 330 while the SAN device 310 also provides the benefits of mirroring for read and write commands.

Returning to FIG. 3(a), for each of the first virtual logical unit 311 and the second virtual logical unit 312 presented by the SAN device 310, only one of the first storage system 320 and the second storage system 330 can be declared as the proxy logical unit at any given time. The server 300 talks to only one logical unit, that is to say, talks to the whole storage system. As shown in the embodiment of FIG. 3(a), the SAN device 310 presents the first virtual logical unit 311 and the second virtual logical unit 312. The first virtual logical unit 311 has the first proxy logical unit of the first virtual logical unit 311 from the first storage system 320, and the second virtual logical unit 312 has the second proxy logical unit of the second virtual logical unit 312 from the second storage system 330. By sending management commands (from the server 300) to both the first virtual logical unit 311 and the second virtual logical unit 312, the same (or two different) management applications can simultaneously mange both the first storage system 320 and the second storage system 330.

An alternate (and probably less desirable) solution is to declare only one virtual logical unit, say the first virtual logical unit 311, to have a proxy logical unit, but to switch the declared proxy logical unit between the first logical unit 321 and the second logical unit 331 dynamically, thus allowing alternating management of the first storage system 320 and the second storage system 330.

Figure 3B:
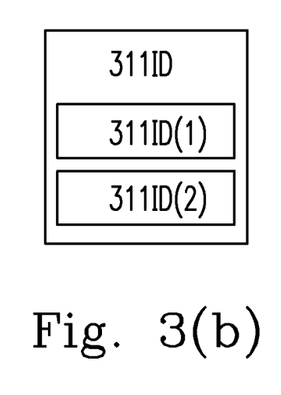
FIG. 3(b) shows an architecture of a first virtual identity.

Please refer to FIG. 3(b), which shows an architecture of the first virtual identity 311ID. The first virtual identity 311ID includes a vendor ID 311ID(1) and a product ID 311ID(2). The identity of a logical unit consists primarily of a Vendor ID, Product ID, model name etc., which may be found in the response to a SCSI Inquiry command requesting Standard Inquiry Data. Server programs, such as storage device drivers, storage management applications, etc., often use the SCSI Inquiry command to determine if a storage system is supported. These programs generally will not send management commands to an unsupported storage system, and may even refuse to operate with the storage system at all.

The SAN device 310 utilizes the invented storage proxy method to return the data obtained from the first proxy logical unit of the first virtual logical unit 311 as Standard Inquiry Data of the first virtual logical unit 311. Moreover, the SAN device 310 utilizes the invented storage proxy method to return the data obtained from the second proxy logical unit of the second virtual logical unit 312 as Standard Inquiry Data of the second virtual logical unit 312.

Figure 4:
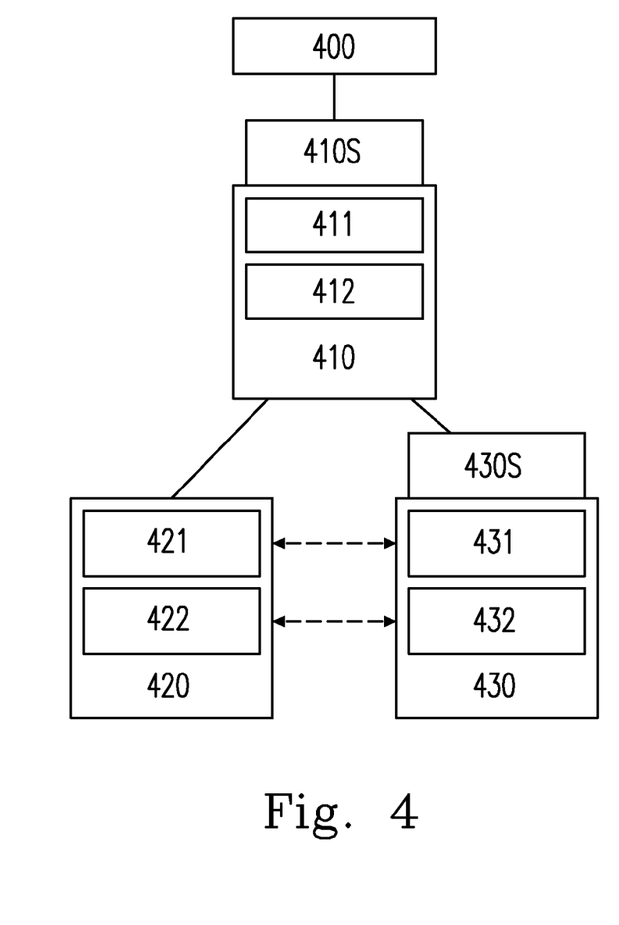
FIG. 4 shows a SAN device utilizing a storage proxy method to present to a server a special proxy logical unit.

Please refer to FIG. 4, which shows a SAN device 410 that utilizes a storage proxy method to present to a server 400 a special proxy logical unit 410S. In FIG. 4, the server 400 is coupled or electrically connected to the SAN device 410, and the SAN device 410 is coupled or electrically connected to a first storage system 420 and a second storage system 430, wherein the first storage system 420 includes a first logical unit 421 and a third logical unit 422, and the second storage system 430 includes a second logical unit 431, a fourth logical unit 432 and a special purpose logical unit 430S. What's more, the SAN device 410 includes a first virtual logical unit 411, a second virtual logical unit 412 and the special proxy logical unit 410S, wherein the special purpose logical unit 430S is presented or simulated as the special proxy logical unit 410S.

As shown in FIG. 4, the second storage system 430 is managed by the SAN device 410 via sending SCSI commands to the special purpose logical unit 430S which is dedicated to the server 400. The special purpose logical unit 430S exists only for the purpose of receiving and acting on management requests, and so it does not typically additionally support normal read and write activities. The SAN device 410 utilizes the invented storage proxy method to present to the server 400 the special proxy logical unit 410S. All commands received by the SAN device 410 for the special proxy logical unit 410S are transparently passed through to the special purpose logical unit 430S.

In particular, Inquiry commands are passed through, so the server 400 has no problem identifying the special purpose logical unit 430S. Thus the server 400 is able to manage the second storage system 430 while the SAN device 410 also provides mirroring (or other complementary services) for the second logical unit 431 and fourth logical unit 432 of the second storage system 430.

Figure 5:
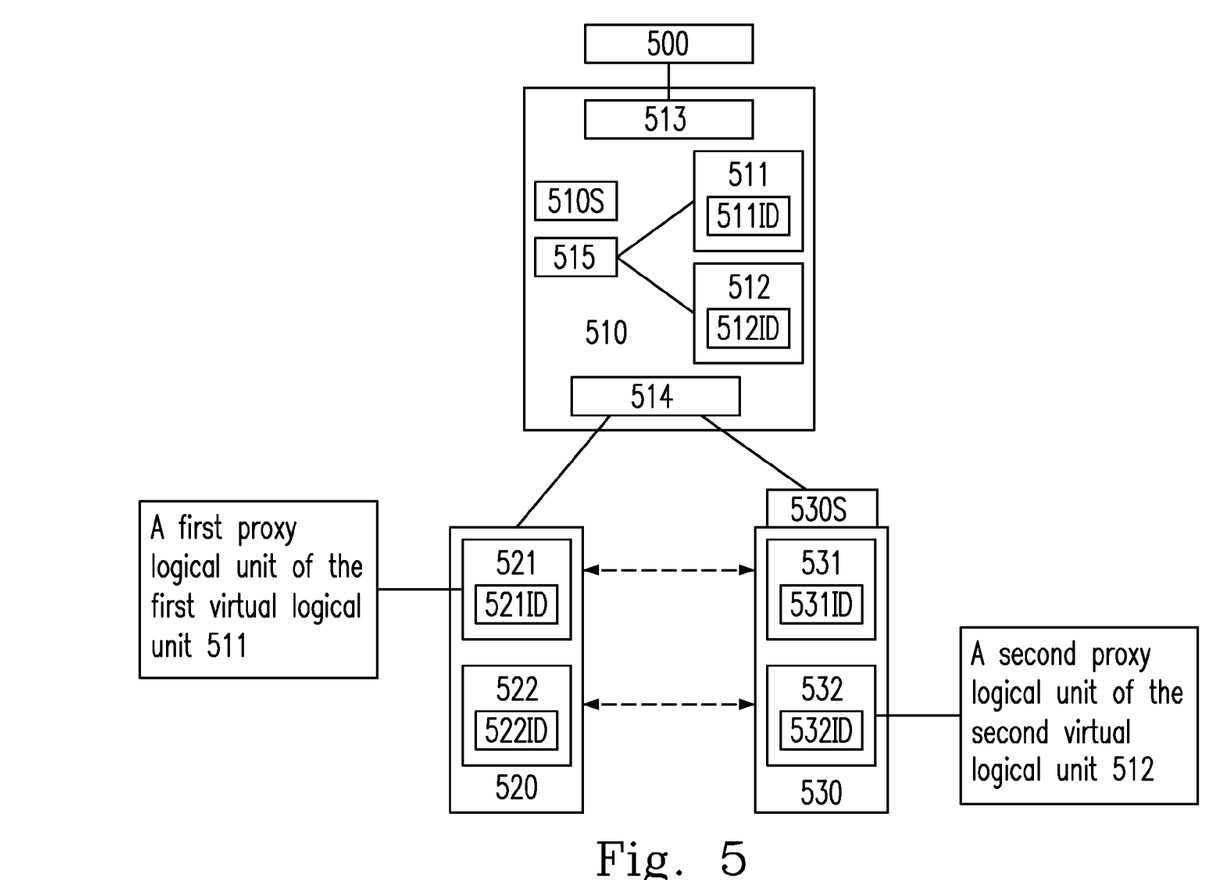
FIG. 5 shows a logical configuration of a first exemplary embodiment of a SAN device according to the present invention.

Please refer to FIG. 5, which shows a logical configuration of a first exemplary embodiment of a SAN device 510 according to the present invention. In FIG. 5, a server 500 is coupled or electrically connected to the SAN device 510, and the SAN device 510 is coupled or electrically connected to a first storage system 520 and a second storage system 530, wherein the first storage system 520 includes a first logical unit 521 and a third logical unit 522, and the second storage system 530 includes a second logical unit 531, a fourth logical unit 532 and a special purpose logical unit 530S. Moreover, the first logical unit 521 includes a first logical unit identity 521ID; the second logical unit 531 includes a second logical unit identity 531ID; the third logical unit 522 includes a third logical unit identity 522ID; and the fourth logical unit 532 includes a fourth logical unit identity 532ID.

As shown in the first exemplary embodiment of FIG. 5, the SAN device 510 includes a first interface 513, a second interface 514, a special proxy logical unit 510S and a processor 515. The first interface 513 is coupled or electrically connected to the server 500 to receive management data or data from the server 500, and the second interface 514 is coupled or electrically connected to the first storage system 520 and the second storage system 530 to provide communication between the SAN device 510 and the first storage system 520 and the second storage system 530.

Returning to FIG. 5, while operating in data-mirroring, for example, the first logical unit 521 is mirrored with the second logical unit 531; the first and the second logical units 521 and 531 constitute a first mirrored logical unit (not shown); and the processor 515 simulates the first mirrored logical unit as a first virtual logical unit 511 in the SAN device 510. Similarly, the third logical unit 522 is mirrored with the fourth logical unit 532; the third and the fourth logical units 522 and 532 constitute a second mirrored logical unit (not shown); and the processor 515 simulates the second mirrored logical unit (not shown) as a second virtual logical unit 512 in the SAN device 510. Furthermore, the first virtual logical unit 511 includes a first virtual identity 511ID and the second virtual logical unit 512 includes a second virtual identity 512ID. At the user's discretion, the processor 515 selects the first logical unit 521 to provide its identity, which is the first logical unit identity 521ID, for the first virtual logical unit 511, and therefore, the first logical unit 521 is called a first proxy logical unit of the first virtual logical unit 511. Similarly, the processor 515 selects the fourth logical unit 532 to provide its identity, which is the fourth logical unit identity 532ID, and therefore, the fourth logical unit 532 is called a second proxy logical unit of the second virtual logical unit 512. For example, the processor 515 simulates the special purpose logical unit 530S as the special proxy logical unit 510S in the SAN device 510.

Instead of creating a new identity for the first virtual logical unit 511 and the second virtual logical unit 512, the invented storage proxy method allows the processor 515 to utilize the identity from the two logical units providing storage for the data-mirroring. That is to say, the processor 515 can utilize either the first logical unit identity 521ID or the second logical unit identity 531ID as the first virtual identity 511ID. Also, the processor 515 can utilize either the third logical unit identity 522ID or the fourth logical unit identity 532ID as the second virtual identity 512ID.

In general, it is not required that the SAN device 510 understands the meaning of a command that it passes through transparently to the first proxy logical unit of the first virtual logical unit 511 or the second proxy logical unit of the second virtual logical unit 512, or the special proxy logical unit 510S. However it must be able to pass through the correct amount of data for the command (if any), in the correct direction. For an FCP (SCSI over FC) SAN, this is no problem. FCP_CMND frames contain this information explicitly for all SCSI commands, in addition to the original SCSI Command Descriptor Block (CDB). The SAN device 510 should make use of this additional information presented in the FCP_CMND frame.

Figure 6:
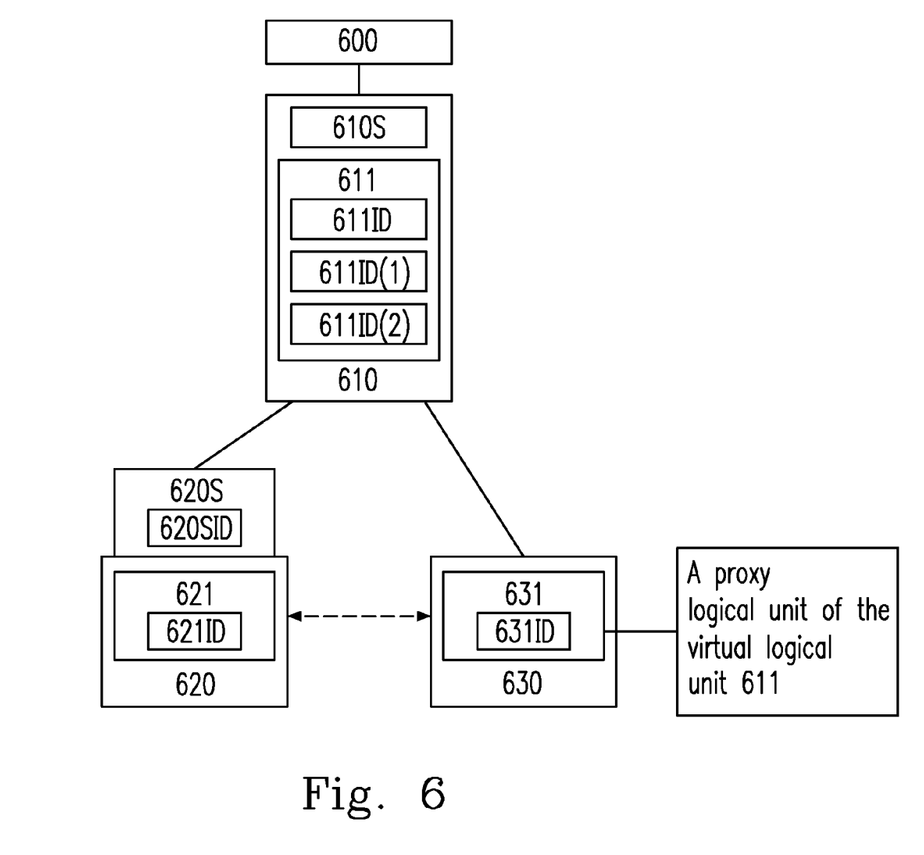
FIG. 6 shows a logical configuration of a second exemplary embodiment of a SAN device according to the present invention.

Please refer to FIG. 6, which shows a logical configuration of a second exemplary embodiment of a SAN device 610 according to the present invention. FIG. 6 discloses a server 600 is coupled or electrically connected to a SAN device 610, and the SAN device 610 is coupled or electrically connected to a proxy storage system 620 and a redundant storage system 630. The proxy storage system 620 includes at least a proxy logical unit 621 and a special purpose logical unit 620S, and the redundant storage system 630 includes a redundant logical unit 631, wherein the proxy logical unit 621 includes a proxy logical unit identity 621ID and the redundant logical unit 631 includes a redundant logical unit identity 631ID. Moreover, the special purpose logical unit 620S includes a special purpose logical unit identity 6205ID.

As shown in the second embodiment of FIG. 6, a two-way data-mirroring is used here to illustrate the invented storage proxy method. While operating in data-mirroring, the proxy logical unit 621 is mirrored with the redundant logical unit 631; and the proxy logical unit 621 and the redundant logical unit 631 constitute a mirrored logical unit (not shown), which is presented or simulated as a virtual logical unit 611 in the SAN device 610.

Instead of creating a new identity for the virtual logical unit 611, the invented storage proxy method allows the SAN device 610, at user's discretion, to utilize the identity from the two logical units providing storage for the mirror. That is to say, the server 600 can utilize either the proxy logical unit identity 621ID or the redundant logical unit identity 631ID as a virtual identity 611ID. As shown in the embodiment of FIG. 6, the redundant logical unit 631 has been chosen to provide its identity, which is the redundant logical unit identity 631ID, for the virtual logical unit 611 and is called a proxy logical unit of the virtual logical unit 611.

The virtual identity 611ID further includes at least a vendor ID 611ID(1) and a product ID 611ID(2).

Returning to FIG. 6, the special purpose logical unit 620S exists only for the purpose of receiving and acting on management data. All the commands sent from the server 600 will be transparently passed through to the special purpose logical unit 620S by the SAN device 610. In addition, the SAN device 610 takes over all the paths between the server 600 and the proxy storage system 620. Simultaneously, the SAN device 610 will simulate the special purpose logical unit 620S as a special proxy logical unit 610S, and all commands received by the SAN device 610 for the 610S are transparently passed through to 620S.

In particular, read identity commands are passed through too, so the special proxy logical unit 610S and the special purpose logical unit 620S share the same identity, which is the special purpose logical unit identity 62051D.

Figure 7:
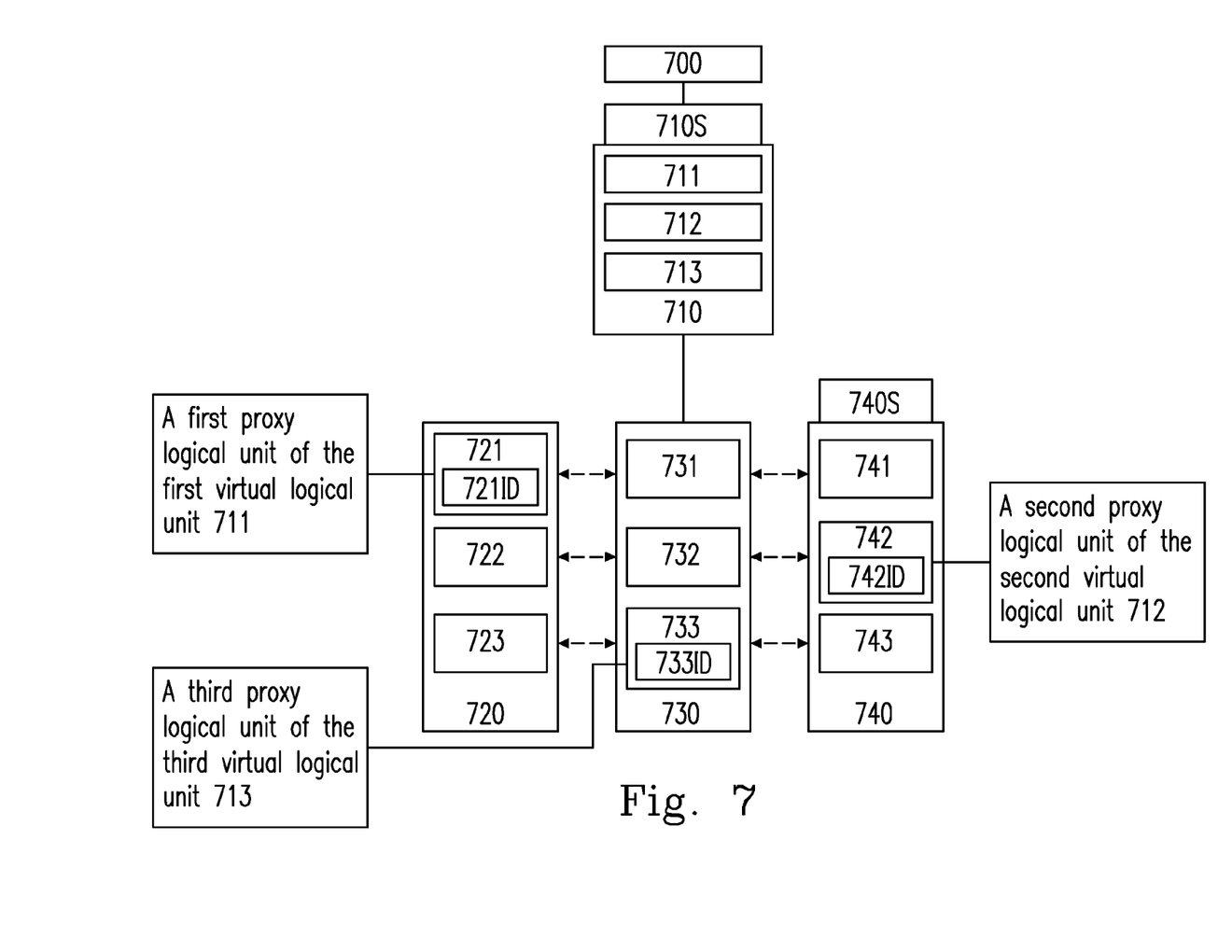
FIG. 7 shows a logical configuration of a third exemplary embodiment of a SAN device according to the present invention.

Please refer to FIG. 7, which shows a logical configuration of a third exemplary embodiment of a SAN device 710 according to the present invention. In FIG. 7, a three-way data-mirroring is enabled by the SAN device 710, a server 700 is coupled or electrically connected to the SAN device 710, and the SAN device 710 is coupled or electrically connected to a first storage system 720, a second storage system 730 and a third storage system 740, wherein the first storage system 720 includes a first logical unit 721, a second logical unit 722 and a third logical unit 723, and the second storage system 730 includes a fourth logical unit 731, a fifth logical unit 732 and a sixth logical unit 733, and the third storage system 740 includes a seventh logical unit 741, an eighth logical unit 742, a ninth logical unit 743 and a special purpose logical unit 740S. Each of the logical units has a specific identity. Furthermore, we specifically point out that the first logical unit 721 includes a first logical unit identity 721ID; the sixth logical unit 733 includes a sixth logical unit identity 733ID, and the eighth logical unit 742 includes an eighth logical unit identity 742ID.

In FIG. 7, the first logical unit 721 is mirrored with the fourth logical unit 731 and the seventh logical unit 741 by the SAN device 710, and the first, the fourth and the seventh logical unit 721, 731 and 741 constitute a first mirrored logical unit (not shown), which is presented or simulated as a first virtual logical unit 711. The second logical unit 722 is mirrored with the fifth logical unit 732 and the eighth logical unit 742 by the SAN device 710, and the second, the fifth and the eighth logical unit 722, 732 and 742 constitute a second mirrored logical unit (not shown), which is presented or simulated as a second virtual logical unit 712. The third logical unit 723 is mirrored with the sixth logical unit 733 and the ninth logical unit 743 by the SAN device 710, and the third, the sixth and the ninth logical unit 723, 733 and 743 constitute a third mirrored logical unit (not shown), which is presented or simulated as a third virtual logical unit 713.

As shown in the third embodiment of FIG. 7, the first logical unit 721 has been chosen to provide its identity, which is the first logical unit identity 721ID, for the first virtual logical unit 711 and is called a first proxy logical unit of the first virtual logical unit 711; the eighth logical unit 742 has been chosen to provide its identity, which is the eighth logical unit identity 742ID, for the second virtual logical unit 712 and is called a second proxy logical unit of the second virtual logical unit 712, and the sixth logical unit 733 has been chosen to provide its identity, which is the sixth logical unit identity 733ID, for the third virtual logical unit 713 and is called a third proxy logical unit of the third virtual logical unit 713.

Returning to FIG. 7, the SAN device 710 simulates the special purpose logical unit 740S as a special proxy logical unit 710S in the SAN device 710. All commands received by the SAN device 710 for the special proxy logical unit 710S are transparently passed through to the special purpose logical unit 740S. In particular, Inquiry commands are passed through, so management applications have no problem identifying the special purpose logical unit 740S. Thus the storage management application is able to manage the third storage system 740 while the application also provides mirroring (or other complementary services) for the seventh logical unit 741, the eighth logical unit 742, and the ninth logical unit 743.

Figure 8:
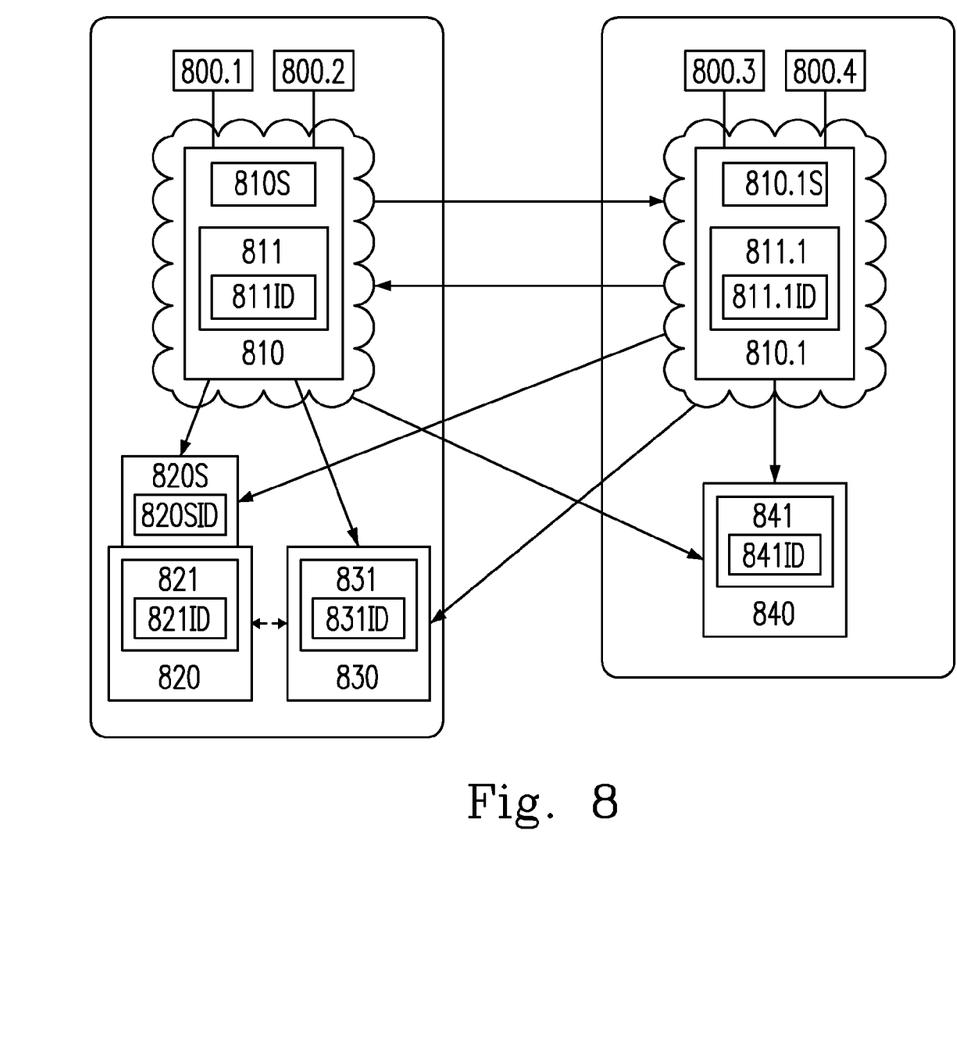
FIG. 8 shows a logical configuration of a fourth exemplary embodiment of a first SAN device and a second SAN device according to the present invention.

Please refer to FIG. 8, which shows a logical configuration of a fourth exemplary embodiment of a first SAN device 810 and a second SAN device 810.1 according to the present invention. A first server 800.1 and a second server 800.2 are coupled or electrically connected to the first SAN device 810, and the first SAN device 810 is coupled or electrically connected to a first storage system 820 and a second storage system 830; the first storage system 820 includes a first logical unit 821 and a special purpose logical unit 820S, wherein the first logical unit 821 includes a first logical unit identity 821ID, and the special purpose logical unit 820S includes a special purpose logical unit identity 82051D; the second storage system 830 includes a second logical unit 831, wherein the second logical unit 831 includes a second logical unit identity 831ID. Furthermore, A third server 800.3 and a fourth server 800.4 are coupled or electrically connected to the second SAN device 810.1, and the second SAN device 810.1 is coupled or electrically connected to a third storage system 840, wherein the third storage system 840 includes a third logical unit 841; the third logical unit 841 includes a third logical unit identity 841ID. The second SAN device 810.1 further includes a second special proxy logical unit 810.1S, a second virtual logical unit 811.1, wherein the second virtual logical unit 811.1 includes a second virtual logical unit identity 811.1ID.

As shown in the fourth embodiment of FIG. 8, the first SAN device 810 is coupled or electrically connected to the second SAN device 810.1 via fibre channel (FC) connection, internet or the like, and the second storage system 830 and the third storage system 840 act as redundant storage systems. The first logical unit 821 is mirrored with the second logical unit 831 and the third logical unit 841 by the first SAN device 810; and the first and the second logical units 821 and 831 constitute a mirrored logical unit (not shown), which is presented or simulated as a first virtual logical unit 811 to the first server 800.1 and the second server 800.2. The invented storage proxy method allows the first SAN device 810, at user's discretion, to utilize the identity from the logical units providing storage for the mirror, that is to say, to utilize the first logical unit identity 821ID, the second logical unit identity 831ID or the third logical unit identity 841ID as a first virtual identity 811ID.

The first SAN device 810 utilizes the invented storage proxy method to present to the first server 800.1 and the second server 800.2 a first special proxy logical unit 810S, and the first special proxy logical unit 810S and the special purpose logical unit 820S share the same identity, which is the special purpose logical unit identity 820SID. The special purpose logical unit 820S is dedicated to one of the first server 800.1, the second server 800.2, the third server 800.3, and the fourth server 800.4. All commands received by the first SAN device 810 for the first special proxy logical unit 810S are transparently passed through to the special purpose logical unit 820S. For example, the special purpose logical unit 820S is presented or simulated as the first special proxy logical unit 810S.

Returning to FIG. 8, via FC connection or internet, the third server 800.3 and the fourth server 800.4 can access the data in the first storage system 820 and the second storage system 830. Thanks to the invented storage proxy method, the third storage system 840 contains the same data as the first storage system 820; the second special proxy logical unit 810.1S contains the same identity as the first special proxy logical unit 810S; the second virtual logical unit 811.1 contains the same information as the first virtual logical unit 811, and the second virtual logical unit identity 811.1ID contains the same identity as the first virtual identity 811ID.

Embodiments

1. In a storage area network (SAN) configuration, a SAN device is configured between a server and a first and a second storage systems, wherein the first storage system includes a first logical unit and the second storage system includes a second logical unit mirrored with the first logical unit, where the first and second logical units combine to form a first mirrored logical unit. Each of the logical units has a specific identity. The SAN device is coupled to the server on one side and is coupled to the first and the second storage systems on the other side. The storage proxy method can be applied to the above-mentioned SAN configuration. The storage proxy method comprises steps of: selecting one of the logical units of one of the first and second storage systems as a first proxy logical unit; simulating the first mirrored logical unit as a first virtual logical unit in the SAN device, wherein the first virtual logical unit has a first virtual identity the same as the identity of the first proxy logical unit; and providing a transparent communication of management functions between the server and the first proxy logical unit via the first virtual logical unit.

2. The storage proxy method of Embodiment 1, wherein the first storage system further includes a third logical unit and the second storage system further includes a fourth logical unit. The third logical unit is mirrored with the fourth logical units; where the third and fourth logical units combine to form a second mirrored logical unit respectively.

3. The storage proxy method of any one of Embodiments 1-2, further comprises newly selecting one of the logical units, i.e. third logical unit or fourth logical unit, as a second proxy logical unit, wherein the second proxy logical unit is neither the first proxy logical unit nor the logical unit mirrored with the first proxy logical unit; and simulating the second mirrored logical unit as a second virtual logical unit in the SAN device.

4. The storage proxy method of any one of Embodiments 1-3, wherein the second virtual logical unit has a second virtual identity being the same as the identity of the second proxy logical unit.

5. The storage proxy method of any one of Embodiments 1-4, wherein the first and second virtual identities include at least one of a vendor identity and a product identity.

6. The storage proxy method of any one of Embodiments 1-5, further comprises simultaneously providing a transparent communication between the server and the first and second storages via the first virtual identity and second virtual identity respectively.

7. The storage proxy method of any one of Embodiments 1-6, wherein one of the first and second storage systems further includes a special purpose logical unit dedicated to the server.

8. The storage proxy method of any one of Embodiments 1-7, further comprises selecting the special purpose logical unit to correspond to a special proxy logical unit; and simulating the special proxy logical unit in the SAN device.

9. A storage area network (SAN) device for providing a transparent communication of management functions, the SAN device includes a first interface, a second interface and a processor, wherein the first interface is coupled to a server and the second interface is coupled to a first storage system and a second storage system. The first storage system includes a first logical unit; the second storage system includes a second logical unit and each of the logical units has a specific identity and the second logical unit mirrored with the first logical unit, where the first and second logical units combine to form a first mirrored logical unit. Furthermore, the processor is configured to select one of the logical units of one of the first and second storage systems as the first proxy logical unit; then to simulate the mirrored logical unit as a first virtual logical unit in the SAN device, wherein the first virtual logical unit has a first virtual identity the same as the identity of the first proxy logical unit; and then to provide a transparent communication of management functions between the server and the first proxy logical unit via the first virtual logical unit.

10. The SAN device of Embodiment 9, wherein the first storage system further includes a third logical unit and a the second storage system further includes a fourth logical unit. What's more, the first and third logical units are mirrored with the second and fourth logical units respectively; where the first, second logical units and third, fourth logical units each combine to form a first and second mirrored logical unit respectively.

11. The SAN device of any one of Embodiments 9-10, wherein the processor is further configured to newly select third or fourth logical units as a second proxy logical unit, wherein the second proxy logical unit is neither the first proxy logical unit nor the logical unit mirrored with the first proxy logical unit, and to simulate the second mirrored logical unit as a second virtual logical unit in the SAN device.

12. The SAN device of any one of Embodiments 9-11, wherein the second virtual logical unit has a second virtual identity being the same as the identity of the second proxy logical unit.

13. The SAN device of any one of Embodiments 9-12, wherein the first and second virtual identities include at least one of a vendor identity and a product identity.

14. The SAN device of any one of Embodiments 9-13, wherein the processor is further configured to simultaneously provide a transparent communication between the server and the first and second storages via the first virtual identity and second virtual identity respectively.

15. The SAN device of any one of Embodiments 9-14, wherein one of the first and second storage systems further includes a special purpose logical unit dedicated to the server.

16. The SAN device of any one of Embodiments 9-15, wherein the processor is further configured to select the special purpose logical unit to correspond to a special proxy logical unit, and to simulate the special proxy logical unit in the SAN device.

17. A method for providing data-replication (or data-mirroring) service transparently between a server and a storage system named proxy storage system to facilitate storage maintenance service without server interruption. The proxy storage system has at least one logical unit named proxy logical unit. The method comprises steps of: firstly, providing a storage area network and the SAN device; secondly, providing a redundant storage system coupled to the SAN device; and thirdly, initiating the mirroring relationship between the logical unit in proxy storage system and logical unit in redundant storage system, where the two logical units combine to form a mirrored logical unit; and fourthly, simulating the mirrored logical unit as a virtual logical unit in the SAN device, wherein the virtual logical unit has a virtual identity being the same as an identity of the proxy logical unit. Moreover, the SAN device is coupled to the server and the proxy storage system.

18. The method of Embodiment 17, wherein the virtual identity includes at least one of a vendor identity and a product identity.

19. The method of any one of Embodiments 17-18, wherein the proxy storage system further includes a special purpose logical unit dedicated to the server.

20. The method of any one of Embodiments 17-19, wherein the method further comprises selecting the special purpose logical unit to correspond to a special proxy logical unit; and simulating the special proxy logical unit in the SAN device.

While the invention has been described in terms of what is presently considered to be the most practical and preferred embodiments, it is to be understood that the invention does not need to be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A storage proxy method used in a storage area network (SAN) comprising a server, a SAN device coupled to the server and received at least one command, and a first and a second storage systems coupled to the SAN device, wherein the first storage system includes a first logical unit, the second storage system includes a second logical unit mirrored with the first logical unit, where the first and second logical units combine to form a first mirrored logical unit, and each of the logical units has a specific identity, the storage proxy method comprising steps of:
    selecting one of the logical units of one of the first and second storage systems as a first proxy logical unit;
    simulating the first mirrored logical unit as a first virtual logical unit in the SAN device, wherein the first virtual logical unit has a first virtual identity the same as the identity of the first proxy logical unit; and
    providing a transparent communication of management functions between the server and the first proxy logical unit via the first virtual logical unit, wherein the at least one command related to the first virtual identity directly bypasses the first virtual logical unit to be free from being translated, and the server and the first and the second storage systems transparently pass therebetween the at least one command.

2. A storage proxy method as claimed in claim 1, wherein the first storage system further includes a third logical unit and the second storage system further includes a fourth logical unit, and the third logical unit is mirrored with the fourth logical unit; where the third and fourth logical units combine to form a second mirrored logical unit.

3. A storage proxy method as claimed in claim 1, further comprising:
    newly selecting one of the logical units as a second proxy logical unit, wherein the second proxy logical unit is neither the first proxy logical unit nor the logical unit mirrored with the first proxy logical unit; and
    simulating the second mirrored logical unit as a second virtual logical unit in the SAN device.

4. A storage proxy method as claimed in claim 3, wherein the second virtual logical unit has a second virtual identity being the same as the identity of the second proxy logical unit.

5. A storage proxy method as claimed in claim 4, wherein the first and second virtual identities include at least one of a vendor identity and a product identity.

6. A storage proxy method as claimed in claim 3, further comprising:
    simultaneously providing a transparent communication of management functions between the server and the first and second storages via the first virtual logical unit and the second virtual logical unit respectively.

7. A storage proxy method as claimed in claim 1, wherein one of the first and second storage systems further includes a special purpose logical unit dedicated to the server.

8. A storage proxy method as claimed in claim 7, further comprising:
    selecting the special purpose logical unit to correspond to a special proxy logical unit; and
    simulating the special proxy logical unit in the SAN device.

9. A storage area network (SAN) device for providing a transparent communication of management functions, the SAN device comprising:
    a first interface coupled to a server sending at least one command;
    a second interface coupled to a first storage system and a second storage system, wherein the first storage system includes a first logical unit, and the second storage system includes a second logical unit mirrored with the first logical unit, where the first and second logical units combine to form a first mirrored logical unit, and each of the logical units has a specific identity;
    and
    a processor configured to:
    selecting one of the logical units of one of the first and second storage systems as a the first proxy logical unit;
    simulating the first mirrored logical unit as a first virtual logical unit in the SAN device, wherein the first virtual logical unit has a first virtual identity the same as the identity of the first proxy logical unit; and
    providing a transparent communication of management functions between the server and the first proxy logical unit via the first virtual logical unit, wherein the at least one command related to the first virtual identity directly bypasses the first virtual logical unit to be free from being translated, and the server and the first and the second storage systems transparently pass therebetween the at least one command.

10. A SAN device as claimed in claim 9, wherein the first storage system further includes a third logical unit and the second storage system further includes a fourth logical unit, and the third logical unit is mirrored with the fourth logical unit; where the third and fourth logical units combine to form a second mirrored logical unit.

11. A SAN device as claimed in claim 9, wherein the processor is further configured to:
    newly selecting one of the logical units as a second proxy logical unit, wherein the second proxy logical unit is neither the first proxy logical unit nor the logical unit mirrored with the first proxy logical unit; and
    simulating the second mirrored logical unit as a second virtual logical unit in the SAN device.

12. A SAN device as claimed in claim 11, wherein the second virtual logical unit has a second virtual identity being the same as the identity of the second proxy logical unit.

13. A SAN device as claimed in claim 12, wherein the first and second virtual identities include at least one of a vendor identity and a product identity.

14. A SAN device as claimed in claim 11, wherein the processor is further configured to:
    simultaneously providing a transparent communication of management functions between the server and the first and second storages via the first virtual logical unit and second virtual logical unit respectively.

15. A SAN device as claimed in claim 9, wherein one of the first and second storage systems further includes a special purpose logical unit dedicated to the server.

16. A SAN device as claimed in claim 15, wherein the processor is further configured to:
   selecting the special purpose logical unit to correspond to a special proxy logical unit; and
   simulating the special proxy logical unit in the SAN device.

17. A method for providing data-replication (or data-mirroring) service transparently between a server and a storage system named proxy storage system to facilitate storage maintenance service without the server interruption, wherein the proxy storage system has at least one logical unit named proxy logical unit, the method comprising steps of:
   providing a storage area network (SAN) device coupled to the server and the proxy storage system;
   providing a redundant storage system coupled to the SAN device, and having a redundant logical unit mirrored with the proxy logical unit, where the proxy logical unit and the redundant logical unit combine to form a mirrored logical unit; and
   initiating the mirrored logical unit as a virtual logical unit in the SAN device, wherein the virtual logical unit has a virtual identity being the same as an identity of the proxy logical unit, the virtual identity directly bypasses the first virtual logical unit to be free from being translated, and the server and the first and the second storage systems transparently pass therebetween the virtual identity.

18. A method as claimed in claim 17, wherein the virtual identity includes at least one of a vendor identity and a product identity.

19. A method as claimed in claim 17, wherein the proxy storage system further includes a special purpose logical unit dedicated to the server.

20. A method as claimed in claim 17, further comprising:
   selecting the special purpose logical unit to correspond to a special proxy logical unit; and
   simulating the special proxy logical unit in the SAN device.

* * * * *